United States Patent
Yang et al.

(10) Patent No.: US 12,510,091 B2
(45) Date of Patent: Dec. 30, 2025

(54) METHOD AND SYSTEM FOR FAILURE PREDICATION OF COOLING FAN

(71) Applicant: RICHTEK TECHNOLOGY CORP., Hsinchu County (TW)

(72) Inventors: Ta-Yung Yang, Taoyuan (TW); I-Chi Lin, New Taipei (TW); Chang-Yi Lin, Hsinchu (TW); Shih-Jen Yang, New Taipei (TW)

(73) Assignee: RICHTEK TECHNOLOGY CORP., Hsinchu County (TW)

( * ) Notice: Subject to any disclaimer, the term of this patent is extended or adjusted under 35 U.S.C. 154(b) by 161 days.

(21) Appl. No.: 18/395,638

(22) Filed: Dec. 25, 2023

(65) Prior Publication Data

US 2025/0067269 A1   Feb. 27, 2025

Related U.S. Application Data

(60) Provisional application No. 63/533,886, filed on Aug. 21, 2023.

(51) Int. Cl.
*F04D 27/00* (2006.01)
*H02P 8/36* (2006.01)

(52) U.S. Cl.
CPC ......... *F04D 27/001* (2013.01); *F04D 27/004* (2013.01); *H02P 8/36* (2013.01)

(58) Field of Classification Search
CPC ... H02P 8/36; H02P 21/00; G06F 1/20; G06F 1/206; F04D 27/001; F04D 29/582; F04D 27/004; F04D 15/0254
See application file for complete search history.

(56) References Cited

U.S. PATENT DOCUMENTS

| | | | |
|---|---|---|---|
| 6,400,113 B1 | 6/2002 | Garcia | |
| 7,387,499 B2 | 6/2008 | Flanigan | |
| 7,602,138 B2 * | 10/2009 | Kaneko | H02P 21/22 318/700 |
| 10,519,960 B2 | 12/2019 | Kelly | |
| 2016/0359442 A1 * | 12/2016 | Zhao | H02P 21/24 |

* cited by examiner

*Primary Examiner* — Said Bouziane
(74) *Attorney, Agent, or Firm* — Winston Hsu

(57) ABSTRACT

A method for predicting failure of a cooling fan includes driving a motor of the cooling fan based on a control speed, generating a first speed according to an average speed of the motor, generating a first current according to an average current of the motor, retrieving a system coefficient from a memory, generating a current threshold according to the first speed and the system coefficient, and triggering an alarm signal if the first current exceeds the current threshold by a threshold amount.

21 Claims, 5 Drawing Sheets

METHOD AND SYSTEM FOR FAILURE PREDICATION OF COOLING FAN

CROSS REFERENCE TO RELATED APPLICATIONS

This application claims the benefit of U.S. Provisional Application No. 63/533,886, filed on Aug. 21, 2023. The content of the application is incorporated herein by reference.

BACKGROUND OF THE INVENTION

1. Field of the Invention

The present invention is related to feedback control, and more particularly to a system and methods of for failure predication of cooling fans.

2. Description of the Prior Art

Cooling fans are often used to cool electronic devices and thereby prevent such devices from overheating. For example, in data centers, fans play a critical role in ensuring that servers would not be damage by excessive heat. Such cooling fans may include fans that are installed within tower servers and rack servers and used to cool internal components thereof, chassis-mounted fans used to cool blade servers and other electronic components housed within a chassis, rack-mounted fans used to cool servers and other electronic components housed within a rack, and large fans used as part of data center air conditioning and air handling systems. These cooling fans are important in upholding the optimal operation of computer systems. If, for some reason, the cooling fans fail to adequately dissipate excess heat, they can result in irreversible heat damage to the electronics.

The prior art patents (e.g., U.S. Pat. Nos. 6,400,113, 7,387,499, and 10,519,960) have disclosed techniques for monitoring, testing, and grouping fans with analogous characteristics to identify the cooling fans that operate beyond reference benchmarks (e.g., revolutions per minute (RPM)).

U.S. Pat. No. 6,400,113, "APPARATUS AND METHOD FOR MONITORING FAN SPEEDS WITHIN A COMPUTING SYSTEM," describes an apparatus for monitoring fan speeds within a computing system including a tachometer turning with the fan, providing a tachometer signal including a number of pulses during each revolution of the fan. This tachometer signal is provided as an input to a signal generator in the form of a flip-flop, which generates a square-wave signal having transitions between high and low levels corresponding to tachometer signal pulses. The square-wave signals are provided as inputs to separate input ports of a microprocessor. These input ports are sequentially sampled at a rate providing at least two samples per period of the fastest square-wave signal, so that transitions of each square wave signal during a predetermined time interval can be detected and counted. For each input port, the number of counted transitions is compared to a stored acceptable value to establish whether the fan is operating in an acceptable speed range.

U.S. Pat. No. 7,387,499, "SYSTEM AND METHOD FOR TESTING THE OPERATION OF A COOLING FAN," is directed to a method for testing the operation of a cooling apparatus of an information handling system. The method may include determining a first rotational speed for operating a fan of the cooling apparatus, with the first rotational speed being less than a maximum rotational speed of the fan. The method includes signaling the fan to rotate at the first rotational speed, and detecting a current rotational speed of the fan. The method includes comparing the detected current rotational speed of the fan to the first rotational speed of the fan, and if the detected current rotational speed is substantially equal to or greater than the first rotational speed of the fan, continuing an initialization process of the information handling system; and if the detected current rotational speed of the fan is less than the first rotational speed, causing further testing of the fan.

U.S. Pat. No. 10,519,960, "FAN FAILURE DETECTION AND REPORTING," is related to fan failure detection and reporting system that organizes fans having similar characteristics into groups. The system establishes, for a given fan group, one or more reference characteristics and identifies, for each reference characteristic, a measure of tolerance. The system identifies as a problem fan a fan having a performance characteristic, obtained via monitoring, which exceeds a corresponding reference characteristic for the group to which the fan belongs by the measure of tolerance for the corresponding reference characteristic, and generates a notification that at least identifies the problem fan. In embodiments, the system is capable of determining the fan characteristics that are used for grouping and for identifying problem fans by monitoring the fans during operation thereof. Consequently, the system is capable of detecting problem fans even when the system initially has limited or no knowledge concerning the fans.

Regrettably, above mentioned prior art is insufficient in detecting fans operating at prescribed speeds but exhibiting indication of early-stage fan failures. Addressing this gap, the present innovation introduces a method and apparatus for accurate prediction of early-stage fan failures.

SUMMARY OF THE INVENTION

An embodiment provides a method for predicting failure of a cooling fan. The method comprises driving a motor of the cooling fan based on a control speed, generating a first speed according to an average speed of the motor, generating a first current according to an average current of the motor, retrieving a system coefficient from a memory, generating a current threshold according to the first speed and the system coefficient, and triggering an alarm signal if the first current exceeds the current threshold by a threshold amount.

Another embodiment provides a method for predicting failure of a cooling fan. The method comprises driving a motor of the cooling fan based on a control speed, generating a first speed according to an average speed of the motor, generating a first current according to an average current of the motor, retrieving a current threshold from a memory according to the first speed, and triggering an alarm signal if the first current exceeds the current threshold by a threshold amount.

Another embodiment provides a method for predicting failure of a cooling fan. The method comprises driving a motor of the cooling fan based on a control speed, generating a first speed according to an average speed of the motor, generating a first current according to an average current of the motor, generating a circuit voltage according to an input voltage of the motor, generating an input power according to the circuit voltage and the first current, retrieving a maximum input power from a memory according to the first speed, and triggering an alarm signal if the input power exceeds the maximum input power by a threshold amount.

Another embodiment provides a cooling fan control system. The cooling fan control system comprise an inverter, a motor coupled to the inverter, a Clarke Transform block coupled to the inverter, a Park Transform block coupled to the Clarke Transform block, a position and speed estimator coupled to the Park Transform block, a low-pass filter coupled to the position and speed estimator, a first subtractor coupled to the position and speed estimator, a first Proportional Integral (PI) controller coupled to the first subtractor, a second subtractor coupled to the first PI controller and the Park Transform block, and a space vector pulse width modulation (SVPWM) block coupled to the second PI controller, the position and speed estimator, and the inverter. The inverter is used to generate a first phase current, a second phase current, and a third phase current according to an input voltage and control signals. The motor is used to drive a cooling fan according to the first phase current, the second phase current, and the third phase current. The Clarke Transform block is used to generate a first stator current and a second stator current according to the first phase current and the second phase current through Clarke transformation. The Park Transform block is used to generate a direct current and a quadrature current according to a rotor angle, the first stator current and the second stator current through Park transformation. The position and speed estimator is used to generate a speed signal and the rotor angle according to the direct current and the quadrature current. The low-pass filter is used to generate an average current of the motor according to the quadrature current. The first subtractor is used to generate a first difference signal according to a control speed and the speed signal. The first Proportional Integral (PI) controller is used to generate a PI signal according to the first difference signal. The second subtractor is used to generate a second difference signal according to the PI signal and the quadrature current. The second Proportional Integral (PI) controller is used to generate a duty signal according to the second difference signal. The space vector pulse width modulation (SVPWM) block is used to generate the control signals for the inverter according to the duty signal and the rotor angle.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
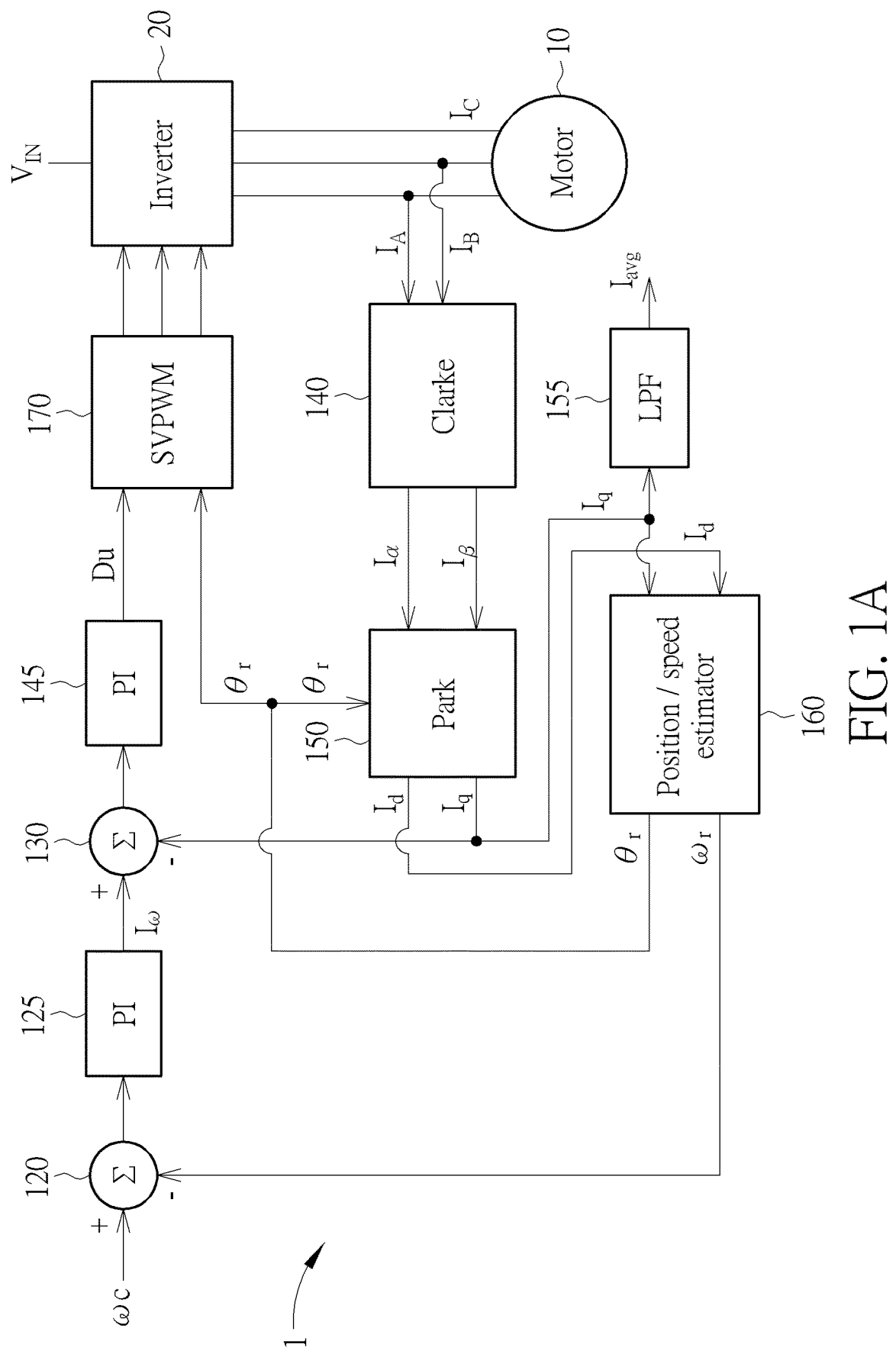
FIG. 1A, FIG. 1B and FIG. 1C are diagrams illustrating a cooling fan control system according to an embodiment of the present invention.

The following description is directed to certain implementations for the purposes of describing innovative aspects of this disclosure. However, a person having ordinary skill in the art will readily recognize that the teachings herein can be applied in a multitude of different ways.

Fans are often used to cool electronic devices and thereby prevent such devices from overheating. For example, in data centers, fans play a critical role in ensuring that servers do not overheat. Such fans may include but are not limited to fans installed within tower and rack servers and used to cool internal components thereof, chassis-mounted fans used to cool blade servers and other electronic components housed within a chassis, rack-mounted fans used to cool servers and other electronic components housed within a rack, and large fans used as part of data center air conditioning and air handling systems.

In many data centers, the fans that are used to cool servers can be removed and replaced by other fans having different characteristics. For example, a chassis-mounted fan that can run at a maximum speed of 6000 RPM may be removed and replaced by a fan that can run at a maximum speed of 8000 RPM. This ability to swap out fans enables one who manages the data center to selectively install various types of fans (e.g., fans made by different manufacturers, different models of fans made by the same manufacturer, and fans having different characteristics) depending on a variety of factors such as cost and performance. For example, one may opt to install fans that provide the highest possible performance regardless of the cost. Another may opt to install fans that provide only the level of performance necessary for adequate server cooling under cost-down strategies.

It is desirable to monitor the performance of one or more installed fans to detect fans failures, as well as fans that are operating in a manner that is abnormal, sub-optimal, unsatisfactory, or indicative of a potential fan failure. This is especially true where the fans themselves do not have a built-in diagnostic control unit. In an environment described above, in which a variety of different fan types can be installed within a server, chassis, rack, or data center, it is possible that the expected characteristics of an installed fan or group of fans will be unknown to the monitoring entity. In such a case, it becomes difficult to determine whether a fan is operating as expected, since there is no data concerning expected characteristics against which to compare the monitored performance of the fan.

A cooling fan control system and method for failure prediction of the cooling fan is described herein that addresses above described issues with conventional fan-based cooling systems. The system may be used to organize fans having similar characteristics into groups. The system may further be used to establish one or more reference characteristic (e.g., input power and average current of the motor) for at least one cooling fan, and to identify a measure of tolerance or threshold for each reference characteristic. The system may further be used to identify a problem fan that operates exceeds the measure of tolerance or threshold for the corresponding reference characteristic, and to generate an alarm signal that identifies the problem fan.

Figures 1B, 1C:
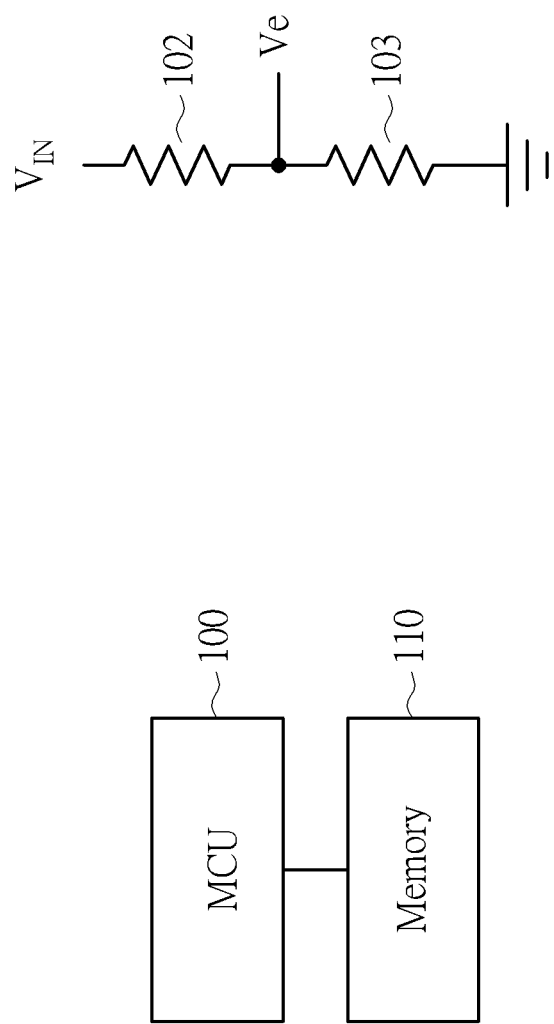

FIGS. 1A, 1B and 1C are diagrams illustrating a cooling fan control system 1 according to an embodiment of the present invention. The cooling fan control system 1 includes a microcontroller (MCU) 100 and a memory 110 (as illustrated in FIG. 1B) coupled together, both of which work together to provide control signals to an inverter 20. The control algorithm employed here is known as field-oriented control (FOC). The microcontroller 100 may generate a control speed $\omega_c$ (in form of a signal) for the motor 10.

The inverter 20 powers the motor 10 to drive a cooling fan. The inverter 20 generates motor phase currents $I_A$, $I_B$, and $I_C$. The phase currents $I_A$ and $I_B$ are sampled by a Clarke Transform block 140 for coordinate transformation (i.e., through Clarke transformation). This conversion shifts a three-axis (two-dimensional coordinate system) to a two-axis system, thereby generating stator currents $I_\alpha$ and $I_\beta$.

If the phase currents $I_A+I_B+I_C=0$, then:

The stator current $I_\alpha$ can be expressed as:

$$I_\alpha = I_A$$

The stator current $I_\beta$ can be expressed as:

$$I_\beta = \frac{I_A + (2 \times I_B)}{\sqrt{3}}$$

The stator currents $I_\alpha$ and $I_\beta$ are then represented on a two-axis orthogonal system, known as the α-β axis system. These currents are further transformed into another two-axis system that rotates with the rotor flux, accomplished through a Park Transform block 150.

The Park Transform block 150 generates a direct current $I_d$ and a quadrature current $I_q$ according to the stator currents $I_\alpha$ and $I_\beta$ and a rotor angle $\theta_r$. The currents $I_d$ and $I_q$ can be described by a two-axis orthogonal rotating coordinate system referred to as the d-q axis. Hence, the currents $I_d$ and $I_q$ can be generated by the following expressions:

$$I_d = I_\alpha \times \cos(\theta r) + I_\beta \times \cos(\theta r)$$

$$I_q = -I_\alpha \times \sin(\theta r) + I_\beta \times \sin(\theta r)$$

In the above expressions, the current's field flux component aligns with the direct current $I_d$, while the torque component aligns with the quadrature current $I_q$. The rotor angle can be given by a position and speed estimator 160.

The currents $I_d$ and $I_q$ can be fed into the position and speed estimator 160. Subsequently, the position and speed estimator 160 can generate a speed signal or (which contains the first speed) and the rotor angle $\theta_r$ accordingly. The first speed describes the angular speed of the motor 10.

A subtractor 120 performs subtraction with the first speed and a control speed $\omega_c$ to generate a first difference and the first difference is input to a Proportional Integral (PI) controller 125. The PI controller 125 then generates a PI signal $I_\omega$ accordingly. Another subtractor 130 then performs subtraction with the PI signal $I_\omega$ and the quadrature current $I_q$. Then, a PI controller 145 takes the output of the subtractor 130 to generate a duty signal Du. A space vector pulse width modulation (SVPWM) block 170 then can generate control signals for the inverter 20 according to the duty signal Du and the rotor angle $\theta_r$.

Consequently, the motor 10 may operate within a feedback loop control, and adjust the average speed of the motor 10 based on the control speed $\omega_c$. Additionally, a low-pass filter (LPF) 155 can be employed to generate an average current $I_{avg}$ of the motor 10 by utilizing the quadrature current $I_q$.

In some embodiments, an approach involving generating the average current $I_{avg}$ of the motor 10 based on the input current of inverter 20 may be employed. As illustrated in FIG. 1C, two resistors 102 and 103, constitute a voltage divider for generating a circuit voltage Ve according to the input voltage $V_{IN}$. The input voltage $V_{IN}$ (which is also related to the input power) may be applied to the motor 10 via the inverter 20. The circuit voltage Ve may be applied to power the microcontroller 100 and/or the memory 110, both of which require less voltage than the motor 10. The memory 110 can be used to store system coefficients, e.g., various system voltages, currents, and thresholds.

The values or signals mentioned above (e.g., $\theta_r$, $I_d$, $I_q$, $I_{avg}$, $V_{IN}$, $\omega_r$, etc.) may be in forms of voltage, current, analog signal and/or digital signal. The signals may carry appropriate values as specified. Those skilled in the art can readily observe those numerous signals and implement them accordingly.

The circuit configuration of the cooling fan control system 1 can be summarized as follows. The cooling fan control system 1 includes an inverter 20, a motor 10 coupled to the inverter 20, a Clarke Transform block 140 coupled to the inverter 20, a Park Transform block 150 coupled to the Clarke Transform block 140, a position and speed estimator 160 coupled to the Park Transform block 150, a low-pass filter 155 coupled to the position and speed estimator 160, a subtractor 120 coupled to the position and speed estimator 160, a PI controller 125 coupled to the subtractor 120, a subtractor 130 coupled to the PI controller 125 and the Park Transform block 150, and an SVPWM block 170 coupled to the PI controller 145, the position and speed estimator 160, and the inverter 20.

The inverter 20 is powered by the input voltage $V_{IN}$ used to generate phase currents $I_A$, $I_B$, and $I_C$ according to an input voltage $V_{IN}$ and control signals. The motor 10 is used to drive a cooling fan according to the phase currents $I_A$, $I_B$, and $I_C$. The Clarke Transform block 140 is used to generate stator currents $I_\alpha$ and $I_\beta$ according to the phase currents $I_A$, $I_B$, and $I_C$ through Clarke transformation. The Park Transform block 150 is used to generate a direct current $I_d$ and a quadrature current $I_q$ according to a rotor angle $\theta_r$, the stator currents $I_\alpha$ and $I_\beta$ through Park transformation. The position and speed estimator 160 is used to generate a speed signal or and the rotor angle $\theta_r$ according to the direct current $I_d$ and the quadrature current $I_q$. The low-pass filter 155 is used to generate an average current $I_{avg}$ of the motor 10 according to the quadrature current $I_q$. The subtractor 120 is used to generate a first difference signal according a control speed $\omega_c$ and the speed signal $\omega_r$. The PI controller 125 is used to generate a PI signal $I_\omega$ according to the first difference signal. The subtractor 130 is used to generate a second difference signal according to the PI signal $I_\omega$ and the quadrature current $I_q$. The PI controller 145 is used to generate a duty signal Du according to the second difference signal. The SVPWM block 170 is used to generate the control signals for the inverter 20 according to the duty signal Du and the rotor angle $\theta_r$.

The cooling fan control system 1 may further include a microcontroller 100 and a memory 110 coupled to the microcontroller 100. The microcontroller 100 may be used for generating the control speed $\omega_c$. The memory 110 may be used to store system coefficients, a current threshold, and/or a maximum power.

The cooling fan control system 1 may further include a first resistor 102 and a second resistor 103 coupled in series to form a voltage divider for generating a circuit voltage Ve according to the input voltage $V_{IN}$.

Figure 2:
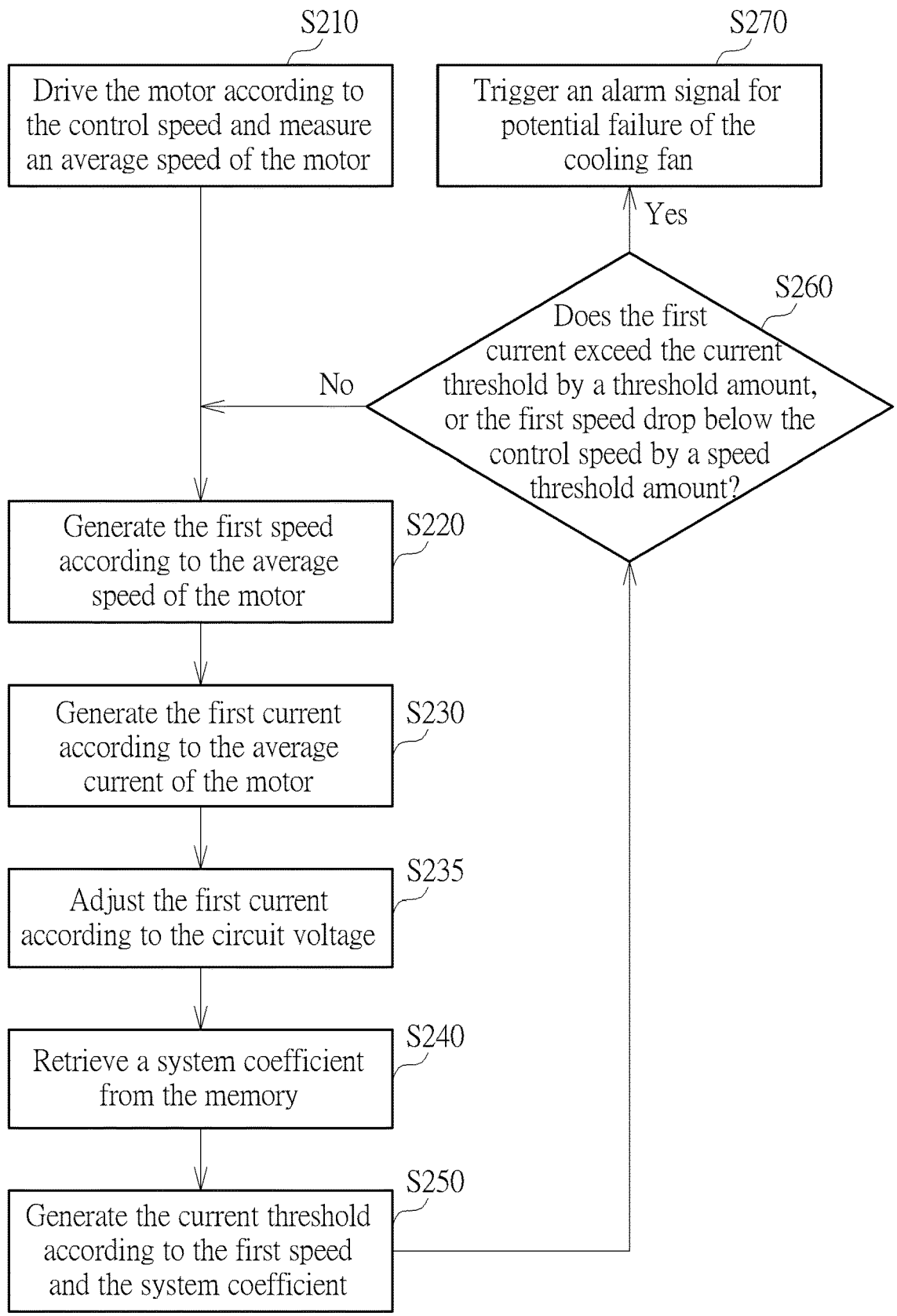
FIG. 2 is a flowchart illustrating an embodiment of a method for predicting failure of a cooling fan implemented by the cooling fan control system of FIGS. 1A-1C.

FIG. 2 is a flowchart of a method 200 for predicting failure of a cooling fan implemented by the cooling fan control system 1. In this embodiment, the first current may be the quadrature current $I_q$ described in the cooling fan control system 1. However, in some other embodiments, the first current may be a different current according to the implementation.

The method 200 includes the following steps:

S210: Drive the motor 10 according to the control speed $\omega_c$ and measure an average speed of the motor 10;

S220: Generate the first speed according to the average speed of the motor 10;
S230: Generate the first current according to the average current $I_{avg}$ of the motor 10;
S235: Adjust the first current according to the circuit voltage Ve;
S240: Retrieve a system coefficient from the memory 110;
S250: Generate the current threshold according to the first speed and the system coefficient;
S260: Does the first current exceed the current threshold by a threshold amount, or the first speed drop below the control speed we by a speed threshold amount; if so, proceed to S270; if not, go back to S220;
S270: Trigger an alarm signal for potential failure of the cooling fan.

Beginning with step S210, the microcontroller 100 can control the motor 10 of a cooling fan via the inverter 20 according to control speed $\omega_c$. Proceeding to step S220, a first speed can be generated based on the average speed of the motor. In step S230, a first current can be generated by considering the average current $I_{avg}$ of the motor 10. Further refinement of the first current can be carried out in step S235, involving the circuit voltage Ve and optionally, one or more system voltages. The system voltages are voltages employed during the system setup phase when a current threshold is established.

In step S240, the system coefficient, which pertains to motor characteristics, fan design, and airflow resistance, is retrieved from the memory 110 via a lookup table corresponding to the first speed. Step S250 involves the generation of a current threshold based on the first speed and the system coefficient. The current threshold is a threshold value calculated from multiplying the system coefficient by the first speed.

In step S260 and S270, an alarm signal for potential failure of the cooling fan can be triggered under two conditions: (1) if the first current exceeds the current threshold by a threshold amount; or (2) if the first speed drops below the control speed $\omega_c$ by a speed threshold amount.

The "average speed of the motor" as used herein refers to the mean motor speed during a period characterized by a consistent control speed $\omega_c$. The "average current of the motor" refers to the mean motor current over the same time frame of the average speed of the motor.

Figure 3:
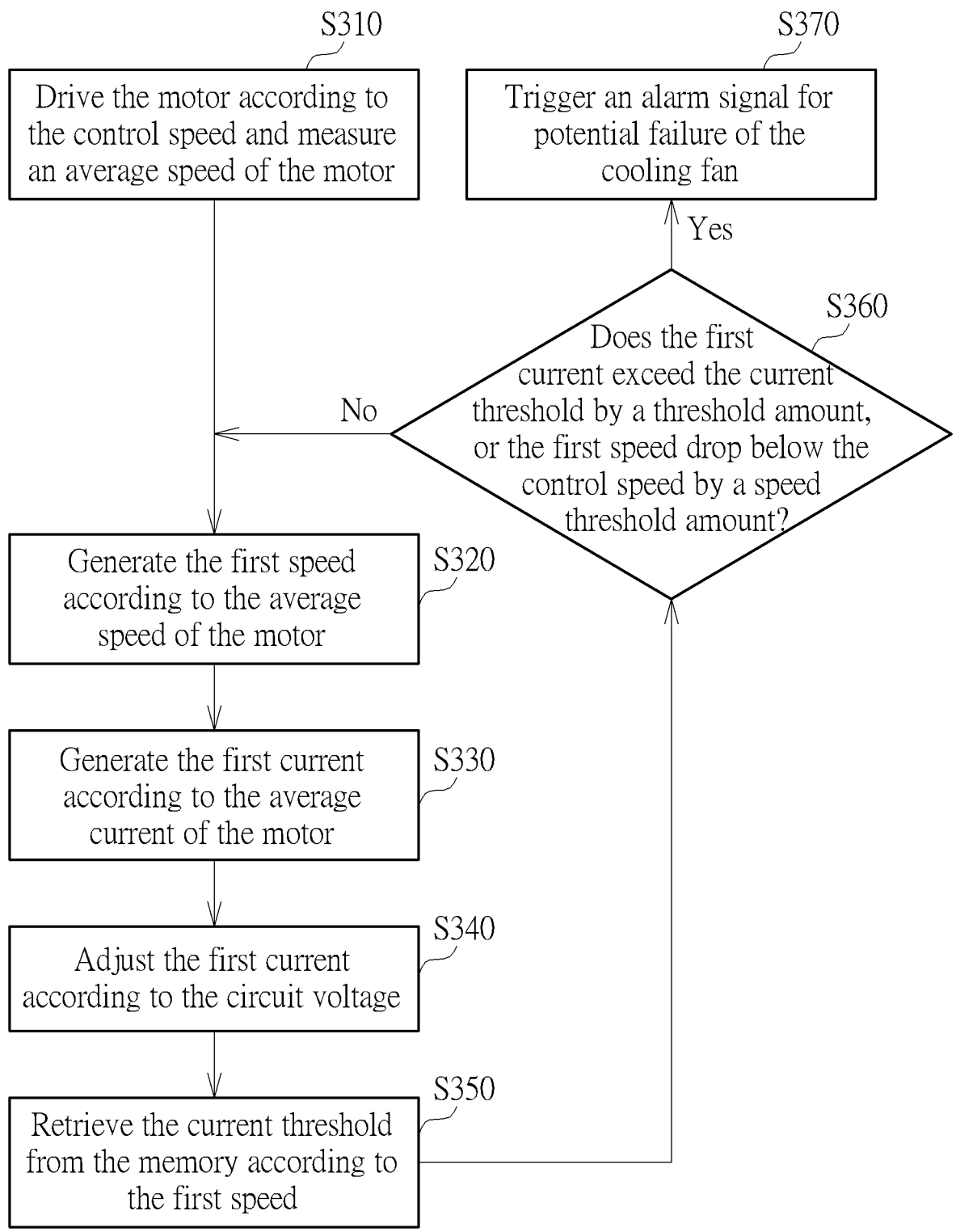
FIG. 3 is a flowchart illustrating another embodiment of a method for predicting failure of a cooling fan implemented by the cooling fan control system of FIGS. 1A-1C.

FIG. 3 is a flowchart of a method 300 for predicting failure of a cooling fan implemented by the cooling fan control system 1. The method 300 includes the following steps:
S310: Drive the motor 10 according to the control speed $\omega_c$ and measure an average speed of the motor 10;
S320: Generate the first speed according to the average speed of the motor 10;
S330: Generate the first current according to the average current $I_{avg}$ of the motor 10;
S340: Adjust the first current according to the circuit voltage Ve;
S350: Retrieve the current threshold $I_{TH}$ from the memory 110 according to the first speed;
S360: Does the first current exceed the current threshold $I_{TH}$ by a threshold amount, or the first speed drop below the control speed $\omega_c$ by a speed threshold amount; if so, proceed to S370; if not, go back to S320;
S370: Trigger an alarm signal for potential failure of the cooling fan.

Beginning with step S310, the microcontroller 100 can control the motor 10 of the cooling fan according to the control speed de via the inverter 20. In step S320, a first speed is generated according to the average speed of the motor 10. In step S330, the first current is generated according to the average current $I_{avg}$ of the motor 10. Further refinement of the first current is carried out in step S340, involving the circuit voltage Ve, and optionally one or more system voltages. The system voltages are voltages employed during the system setup phase when a current threshold $I_{TH}$ is established.

In step S350, the current threshold $I_{TH}$, which pertains to motor speed value, motor characteristics, fan design, and airflow resistance, is retrieved from the memory 110 via a lookup table corresponding to the first speed. The current threshold $I_{TH}$ is a value according to the characteristic of the motor 10, and pre-stored in the memory 110.

In step S360 and S370, an alarm signal for potential failure of the cooling fan can be triggered under two conditions: (1) if the first current exceeds the current threshold $I_{TH}$ by a threshold amount; or (2) if the first speed drops below the control speed $\omega_c$ by a speed threshold amount.

The "average speed of the motor" as used herein refers to the mean motor speed during a period characterized by a consistent control speed $\omega_c$. The "average current of the motor" refers to the mean motor current over the same time frame of the average speed of the motor.

Figure 4:
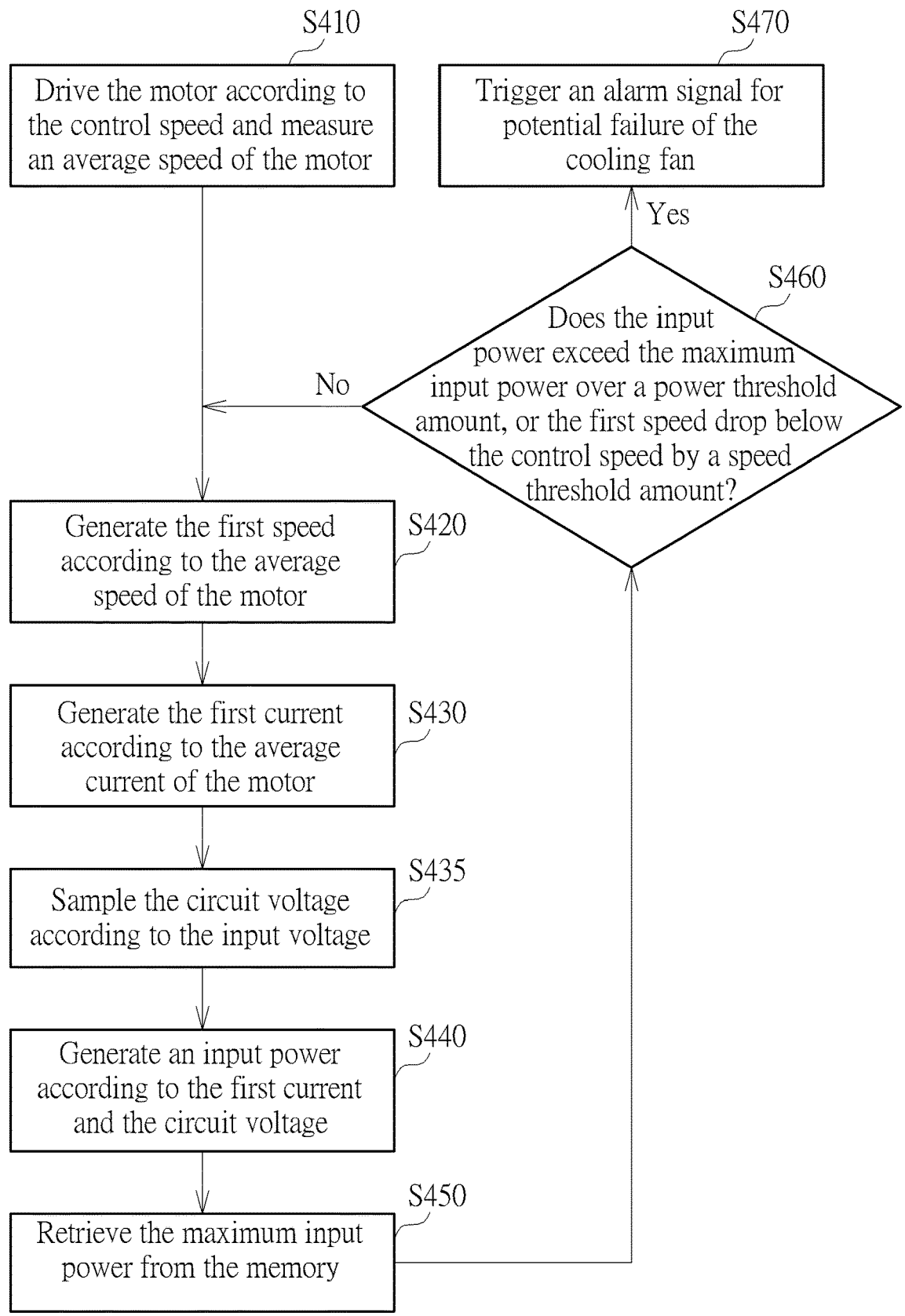
FIG. 4 is flowchart illustrating another embodiment of a method for predicting failure of a cooling fan implemented by the cooling fan control system of FIGS. 1A-1C.

FIG. 4 is a flowchart of a method 400 for predicting failure of a cooling fan implemented by the cooling fan control system 1. The method 400 includes the following steps:
S410: Drive the motor 10 according to the control speed $\omega_c$ and measure an average speed of the motor 10;
S420: Generate the first speed according to the average speed of the motor 10;
S430: Generate the first current according to the average current $I_{avg}$ of the motor 10;
S435: Sample the circuit voltage Ve according to the input voltage $V_{IN}$
S440: Generate an input power according to the first current and the circuit voltage Ve;
S450: Retrieve the maximum input power from the memory 110;
S460: Does the input power exceed the maximum input power over a power threshold amount, or the first speed drop below the control speed $\omega_c$ by a speed threshold amount; if so, proceed to S470; if not, go back to S420;
S470: Trigger an alarm signal for potential failure of the cooling fan.

Beginning with step S410, the microcontroller 100 can control the motor 10 of the cooling fan according to the control speed $\omega_c$ via the inverter 20. In step S420, the first speed is generated according to the average speed of the motor 10. In step S430, the first current is generated according to the average current $I_{avg}$ of the motor 10. In step 435, the microcontroller 100 samples the circuit voltage Ve that is related to the input voltage $V_{IN}$ of the motor 10. The circuit voltage Ve, sampled by the microprocessor 110, can be used to calculate the input power, and the input power can be compared with a reference power for prediction of cooling fan failure. In step S440, an input power is generated according to the first current and the circuit voltage Ve.

In step S450, a maximum input power, which pertains to motor characteristics, fan design, and airflow resistance, can be retrieved from the memory 110 via a lookup table corresponding to the first speed. The maximum input power is a value according to the characteristic of the motor 10, and pre-stored in the memory 110.

In step S460 and S470, an alarm signal for potential failure of the cooling fan can be triggered under two conditions: (1) input power exceed the maximum input power over a power threshold amount; or (2) if the first speed drops below the control speed $\omega_c$ by a speed threshold amount.

The "average speed of the motor" as used herein refers to the mean motor speed during a period characterized by a consistent control speed $\omega_c$. The "average current of the motor" refers to the mean motor current over the same time frame of the average speed of the motor.

The various embodiments described above have disclosed a system and methods for predicting failure of the cooling fan. Thus, the failures in early stage can be quickly detected and be addressed promptly.

The terms "coupled," "connected", "connecting," "electrically connected," etc., are used interchangeably herein to generally refer to the condition of being electrically connected (through wire or wireless means). Similarly, a first entity is considered to be in "communication" or "connection" with a second entity (or entities) when the first entity electrically sends and/or receives (through wire or wireless means) information signals to/from the second entity regardless of the type (analog or digital) of those signals. It is further noted that various figures (including component diagrams) shown and discussed herein are for illustrative purpose only, and are not drawn to scale.

It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single-chip processor or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein or various blocks or steps of a method, operation, process or algorithm disclosed herein can be implemented as one or more modules of one or more computer programs. Such computer programs can include non-transitory processor-executable or computer-executable instructions encoded on one or more tangible processor-readable or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A method for predicting failure of a cooling fan comprising:
   driving a motor of the cooling fan based on a control speed;
   generating a first speed according to an average speed of the motor, wherein the average speed is generated by a microcontroller;
   generating a first current according to an average current of the motor, wherein the average current is generated by a low pass filter,
   retrieving a system coefficient from a memory;
   generating a current threshold according to the first speed and the system coefficient, wherein the current threshold is a failure prediction boundary that varies with variation of the first speed according to the system coefficient; and
   triggering an alarm signal if the first current exceeds the current threshold by a threshold amount.

2. The method of claim 1 further comprising:
   generating a circuit voltage of the microcontroller according to an input voltage of the motor; and
   adjusting the first current according to the circuit voltage of the microcontroller.

3. The method of claim 2, wherein the motor is driven by the microcontroller using a field orient control (FOC) algorithm.

4. The method of claim 1 further comprising triggering the alarm signal if the first speed drops below the control speed by a speed threshold amount.

5. The method of claim 1, wherein the system coefficient is retrieved through a lookup table in the memory according to the first speed.

6. The method of claim 1, wherein the current threshold equals the system coefficient multiplied by the first speed.

7. The method of claim 1, wherein the system coefficient is related to motor characteristics, a fan design and an airflow resistance.

8. The method of claim 1, wherein the average speed of the motor is a mean motor speed during a time period when the motor is running consistently on the control speed, and the average current of the motor is a mean motor current over the time period.

9. A method for predicting failure of a cooling fan comprising:
   driving a motor of the cooling fan based on a control speed;
   generating a first speed according to an average speed of the motor, wherein the average speed is generated by a microcontroller;
   generating a first current according to an average current of the motor, wherein the average current is generated by a low pass filter;
   retrieving a current threshold from a memory according to the first speed, wherein the memory stores a lookup table correlating speed values to current thresholds; and
   triggering an alarm signal if the first current exceeds the current threshold by a threshold amount.

10. The method of claim 9 further comprising:
    generating a circuit voltage of the microcontroller according to an input voltage of the motor; and
    adjusting the first current according to the circuit voltage of the microcontroller.

11. The method of claim 10, wherein the motor is driven by the microcontroller using a field orient control (FOC) algorithm.

12. The method of claim 9 further comprising triggering the alarm signal if the first speed drops below the control speed by a speed threshold amount.

13. The method of claim 9, wherein the current threshold is retrieved through a lookup table in the memory according to the first speed.

14. The method of claim 9, wherein the current threshold is related to motor characteristics, a fan design and an airflow resistance.

15. The method of claim 9, wherein the average speed of the motor is a mean motor speed during a time period when the motor is running consistently on the control speed, and the average current of the motor is a mean motor current over the time period.

16. A method for predicting failure of a cooling fan comprising:
    driving a motor of the cooling fan based on a control speed;
    generating a first speed according to an average speed of the motor;
    generating a first current according to an average current of the motor;
    generating a circuit voltage according to an input voltage of the motor;
    generating an input power according to the circuit voltage and the first current;
    retrieving a maximum input power from a memory according to the first speed, wherein the maximum input power threshold is a predetermined failure prediction boundary; and
    triggering an alarm signal if the input power exceeds the maximum input power by a threshold amount.

17. The method of claim 16 further comprising triggering the alarm signal if the first speed drops below the control speed by a speed threshold amount.

18. The method of claim 16, wherein the maximum input power is retrieved by a lookup table in the memory according to the first speed.

19. The method of claim 16, wherein the motor is driven by the microcontroller using a field orient control (FOC) algorithm.

20. A cooling fan control system comprising:
    an inverter configured to generate a first phase current, a second phase current, and a third phase current according to an input voltage and control signals;
    a motor coupled to the inverter, configured to drive a cooling fan according to the first phase current, the second phase current, and the third phase current;
    a Clarke Transform block coupled to the inverter, configured to generate a first stator current and a second stator current according to the first phase current and the second phase current through Clarke transformation;
    a Park Transform block coupled to the Clarke Transform block, configured to generate a direct current and a quadrature current according to a rotor angle, the first stator current and the second stator current through Park transformation;
    a position and speed estimator coupled to the Park Transform block, configured to generate a speed signal and the rotor angle according to the direct current and the quadrature current;
    a low-pass filter coupled to the position and speed estimator, configured to generate an average current of the motor according to the quadrature current, wherein the average current is used for predicting failure of the cooling fan;

a first subtractor coupled to the position and speed estimator, configured to generate a first difference signal according to a control speed and the speed signal;

a first Proportional Integral (PI) controller coupled to the first subtractor, configured to generate a PI signal according to the first difference signal;

a second subtractor coupled to the first PI controller and the Park Transform block, configured to generate a second difference signal according to the PI signal and the quadrature current;

a second Proportional Integral (PI) controller coupled to the second subtractor, configured to generate a duty signal according to the second difference signal;

a space vector pulse width modulation (SVPWM) block coupled to the second PI controller, the position and speed estimator, and the inverter, configured to generate the control signals for the inverter according to the duty signal and the rotor angle;

a memory configured to store system coefficients, a current threshold, and/or a maximum power; and a microcontroller coupled to the memory, configured to:
receive the average current from the low-pass filter;
retrieve the current threshold from a memory according to the speed signal from the position and speed estimator;
compare the average current to current threshold; and
trigger an alarm signal when the average current exceeds the current threshold by a threshold amount.

21. The cooling fan control system of claim 20 further comprising:

a first resistor and a second resistor coupled in series to form a voltage divider, wherein the voltage divider generates a circuit voltage according to the input voltage.

* * * * *